J. G. GROSS

BEVEL CUT PATCH FOR TUBES AND OTHER RUBBER GOODS

Nov. 11, 1930. Original Filed Aug. 20, 1924 Re. 17,860

Inventor
J. G. Gross
by Hazard and Miller
Attorneys.

Reissued Nov. 11, 1930

Re. 17,860

UNITED STATES PATENT OFFICE

JACOB G. GROSS, OF SAN GABRIEL, CALIFORNIA

BEVEL-CUT PATCH FOR TUBES AND OTHER RUBBER GOODS

Original No. 1,596,430, dated August 17, 1926, Serial No. 733,172, filed August 20, 1924. Application for reissue filed May 5, 1930. Serial No. 449,996.

This invention relates to improvements in rubber patches adapted to be used in patching rubber tire tubes and other rubber goods.

It is a broad object of this invention to provide an improved patch which has a beveled edge.

It is very desirable in patching rubber goods, especially tire tubes, to provide a patch having a beveled edge for the reason that such an edge provides a very small projection which may be caught or rubbed so as to peel the patch from the tire. Heretofore, as far as I am aware, such a patch has been provided by molding. Each patch is formed of an outer layer of cured rubber and an inner layer of uncured rubber. In order to form a secure patch uncured rubber is necessary. However, in the process of making patches of cured and uncured rubber by molding, the edges of the uncured rubber become cured or partially cured, and especially so when a patch having a beveled edge is provided.

It is therefore an object of this invention to provide a patch having a beveled edge which is cut out of a sheet of material formed of a layer of cured rubber, a layer of uncured rubber and a layer of fabric, so that the edges of the layer of uncured rubber will not become cured or partially cured as has been experienced when the patches are molded. It will readily be understood that when the edges of the uncured rubber are cured or partially cured, that these edges do not firmly stick to the surface of the material being patched, but instead have a tendency to peel back, so that in the course of time, the complete patch is entirely peeled off from the article patched.

With the foregoing and other objects in view which will be made manifest in the following detailed description and pointed out in the appended claims, reference is had to the accompanying drawings for an illustrative embodiment of the invention, wherein:

Figure 1:
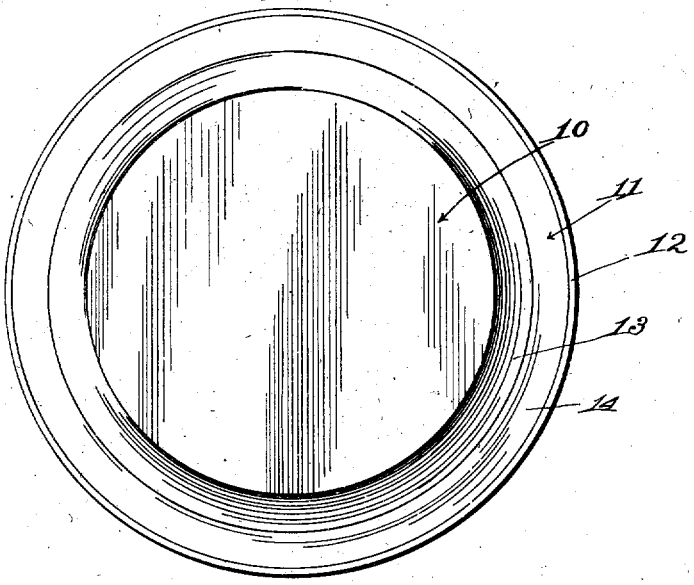
Figure 1 is a top plan view of the improved rubber patch.
Figure 2:
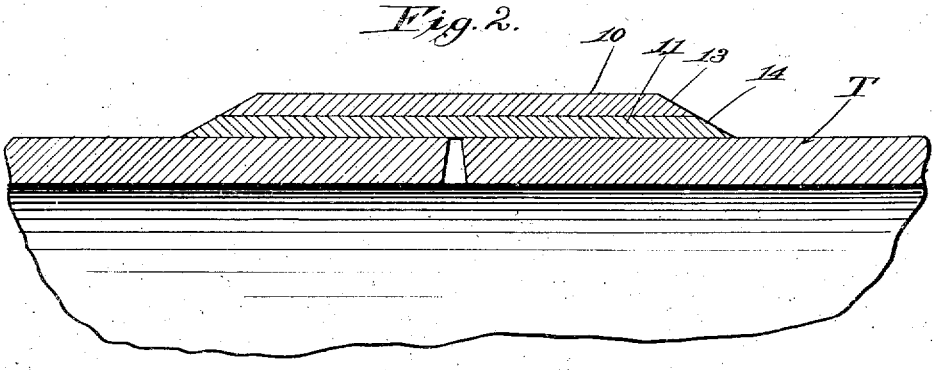
Fig. 2 is a vertical section through a portion of a tire tube to which one of the improved patches has been applied.

Referring to the accompanying drawings wherein similar reference characters designate similar parts throughout, the improved patch consists of a top layer 10 of cured rubber. Beneath this layer of cured rubber there is a second layer 11 which is formed of uncured rubber and on the under side of the layer 11 of uncured rubber there is a layer of protective fabric 12. The edges of all of the layers are beveled, and the patch may be produced in the following manner: A section of patching material is taken consisting of a layer of cured rubber, uncured rubber and fabric and this is cut to produce the beveled edge, such as by cutting it by a knife in an inclined position. The beveled edges on the layer 11 of uncured rubber and on the layer 10 of cured rubber are indicated at 13 and 14 respectively. The patch so produced is characterized by the fact that the thin edges of the uncured layer 11 are neither cured nor partially cured.

When it is desired to mend a rubber article, such as a tire tube T, cement may be applied to the article around the puncture or aperture therein. When this cement is substantially dry, the layer of protective fabric 12 is removed and the patch applied in the usual manner. It will be readily understood that the improved patch has many advantages which are present in the conventional patching material in that it has a layer of cured rubber giving the patch the desired strength and the uncured rubber which is especially advantageous in forming a secure bond with the tire tube T.

The advantages of the patch of the improved construction over the conventional patch reside in the fact that the edges of the uncured layer 11 which project from beneath the edges of the cured layer 10 are neither cured nor partially cured, so that these edges cling tenaciously to the tire tube. In this manner the edges of the uncured layer 11 are not apt to loosen from the tire tube T or to start peeling back. It will be readily understood that if the edges of the patch should ever start to peel back, after such peeling has started, it is not difficult to remove the complete patch. Another advantage of the patch resides in the fact that the edges of the patch are beveled so that there will be no sharp edge adapted to be caught by or rubbed by the interior of a tire casing, and consequently any relative movement between the tire casing and the tire tube will not tend to rub off or peel off the patch. The patch is round, and the beveled edge is annular. This shape is preferable because the beveled edge has no irregularities or corners which would provide places where the patch might be started to peel from the tube T. Furthermore, in a round patch the stresses are balanced, and there is but little danger, if any, of the patch being pulled from place due to such stresses. The beveled edge is knife-cut, as distinguished from a molded edge, and it is therefore possessed of an exceedingly sharp edge of uncured rubber which adheres very tenaciously to the tube T.

From the above described construction it will be appreciated that an improved tire patch is provided having two layers, one of uncured rubber and the other of cured rubber, and that both layers have beveled edges with the edges of the layer of uncured rubber projecting from beneath the edges of the layer of cured rubber.

It is to be understood that various changes may be made in the detail of construction without departing from the spirit or scope of the invention as defined by the appended claims.

I claim as my invention:

1. A rubber patch consisting of a layer of cured rubber and a layer of uncured rubber, the edges of both of said layers being beveled with the edges of the uncured layer projecting from beneath the edges of the cured layer, the edges of said uncured layer being characterized by being neither cured nor partially cured.

2. A rubber patch consisting of a layer of cured rubber, a layer of uncured rubber therebeneath having its edges projecting from beneath the edges of said layer of cured rubber, and a layer of fabric beneath said layer of uncured rubber, the edges of said fabric projecting from beneath the edges of said layer of uncured rubber, all of said edges being beveled.

3. A rubber patch consisting of a layer of cured rubber, and a layer of uncured rubber therebeneath having its edges projecting from beneath the edges of the layer of cured rubber, the edges of both layers being beveled.

4. A rubber patch consisting of a layer of cured rubber, and a layer of uncured rubber therebeneath having its edges projecting symmetrically from beneath the edges of the layer of cured rubber, said two layers being round and both having annular beveled edges.

In testimony whereof, I have hereunto set my hand at Los Angeles, Los Angeles county, California, this 30th day of April, 1930.

JACOB G. GROSS.